United States Patent

[11] 3,602,556

[72] Inventor Tadeusz Sendzimir
9 Randolph Avenue, Waterbury, Conn. 06710
[21] Appl. No. 861,834
[22] Filed Sept. 29, 1969
[45] Patented Aug. 31, 1971

[54] CREEP-FLOW BEARING
30 Claims, 7 Drawing Figs.

[52] U.S. Cl. .................................................. 308/77, 72/236
[51] Int. Cl. ...................................................... F16c 1/24
[50] Field of Search ........................................... 308/5, 77, 78; 184/6 F; 72/236

[56] References Cited
UNITED STATES PATENTS
3,333,907   8/1967   Lamb ........................... 308/77
3,192,757   6/1965   Diolot ........................... 72/236

Primary Examiner—Martin P. Schwadron
Assistant Examiner—R. H. Lazarus
Attorney—Samuel Lebowitz ABSTRACT: The maintenance of a substantially constant relative positioning between the path of a movable element and a support therefor, for example, a rotary roll and a bearing support therefor, by providing a phase-changing lubricating and pressure-bearing medium between the element and support. The selected medium is characterized by its capability of assuming a solid-state adjacent to the interface between the movable element and support and a creeping state remotely therefrom, as determined by varying temperature and pressure conditions, as exemplified by ice, derived from frozen water, organic compounds such as wax, paraffin, etc., having sharp transition points from the liquid to the solid state, and metals and alloys thereof of low melting points having similar sharp transition characteristics. A departure from the desired constant positioning is sensed to control the replenishment of the phase-changing medium in the liquid state to the mass thereof remote from the interface for transformation to the solid state by heat-exchange means which is operable to restore the parts to the desired position. The system is especially effective in the maintenance of the desired position of the working parts in heavy-duty machinery such as the rolls in cluster-type rolling mills.

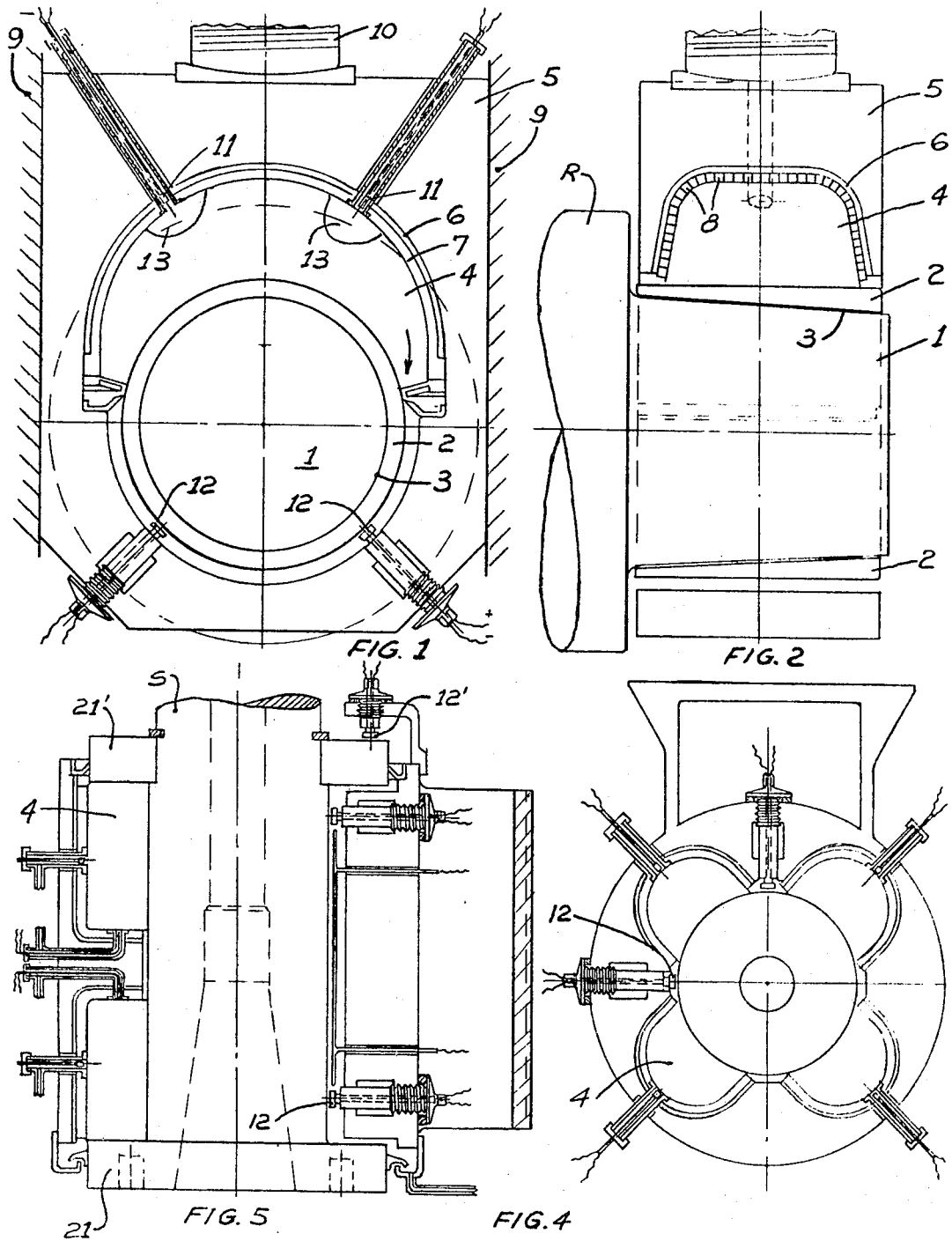

INVENTOR
TADEUSZ SENDZIMIR by Samuel Schmitz
Attorney

CREEP-FLOW BEARING

The instant invention relates to a novel method of and apparatus for taking up loads exerted by rotating and/or sliding machine parts such as shafts, slides and other components, and maintaining them in their precise position in relation to other parts of the machine. It consists in using a relatively fast wearing bearing material that changes its phase from solid to a liquid or even gaseous state when contacting sliding machine parts under load. It involves using, as bearing material, a creeping solid, i.e., a simple or composite substance which behaves like a solid under the temperature and load conditions of the bearing, but is subject to creep characterized by slow sliding of grains in the direction of lesser stresses. Such materials are, for example, ice, which is solidified water, organic materials such as waxes and paraffins, many of the low melting-point metals such as lead, bismuth, tin, zinc, aluminum, alkali metals, or the alloys thereof, all of which materials have the common characteristic of a sharp transition point between their liquid and solid state.

Such bearing substance is preferably fed, in a liquid state, into a chamber or cavity provided in the body of the bearings, at the point or points preferably remote from the area of sliding contact. It is then solidified by lowering its temperature, while contained within such cavity, so that the portion of the bearing substance which is actually in pressure contact with the sliding machine parts such as a shaft, slide and the like, is already in solid state and at a temperature suitable for that particular bearing material.

Depending on the load, sliding velocity, condition of the sliding surface and the characteristics of the bearing substance itself, the wear at the interface may take place at various rates of speed, and it is a feature of the instant invention that it is replaced by a supply of fresh bearing substance through the feeding points, to maintain the geometric location of the shafts or other part which the bearing is called upon to support, within the required limits, which may be much narrower than those it is possible to obtain by bearings known today.

It is the object of the present invention to utilize the desirable characteristics of a phase-changing lubricating and pressure-bearing medium, as exemplified by ice, waxes, paraffins and low-temperature melting metals and alloys, in all classes of machinery requiring low friction bearings which are capable of maintaining substantially constant the relative positioning of the stationary and movable parts.

It is a further object of the invention to provide a bearing assembly for all classes of machinery embodying a phase-changing lubricating and pressure-bearing medium which is self-replenishing in order to effect economies in the operation of the installation.

While the low frictional characteristics of ice are known and find application in the well-known sport of ice-skating, as well as in the specific application of ice bearings as disclosed in the U.S. Pat. to Lamb, No. 3,333,907, this property is utilized in conjunction with the capability of ice to withstand tremendous pressures to render such material especially adaptable to machinery subjected to high loading stresses, for example, rolling mill installations. Thus, a highly reliable and economical installation is rendered possible by employing ice as a phase-changing lubricating and pressure-bearing medium which is confined in a strong shell for withstanding the tremendous pressures exerted thereon. The shell is fitted with passages or conduits for circulating a refrigerating fluid for freezing the water which is fed to the bearing at one or more points remote from the bearing surface to convert the liquid into a solid state and to continuously replenish the bearing material required to maintain the machine parts in substantially constant relative positions. Protection from excessive heat losses is afforded by layers of suitable suitable insulating materials at the outer boundaries of the bearing shell. The supply of the bearing material in a fluid state may be constant or incremental, as controlled by the need therefore in response to the operation of sensing gauges to indicate the incidence of any change in position of the part being supported by the bearing due to the wear of the ice.

While ice is especially suitable as a bearing medium, other compositions of the type mentioned above, having similar physical characteristics, may be employed.

Other objects and purposes will appear from the detailed description of the invention following hereinafter, taken in conjunction with the accompany drawings, wherein FIG. 1 is a vertical sectional view of one embodiment of the invention;

FIG. 2 is a vertical longitudinal sectional view of one end of FIG. 1;

FIG. 4 is a sectional view of another embodiment of the invention;

FIG. 5 is a horizontal sectional view of FIG. 4;

Figure 7:
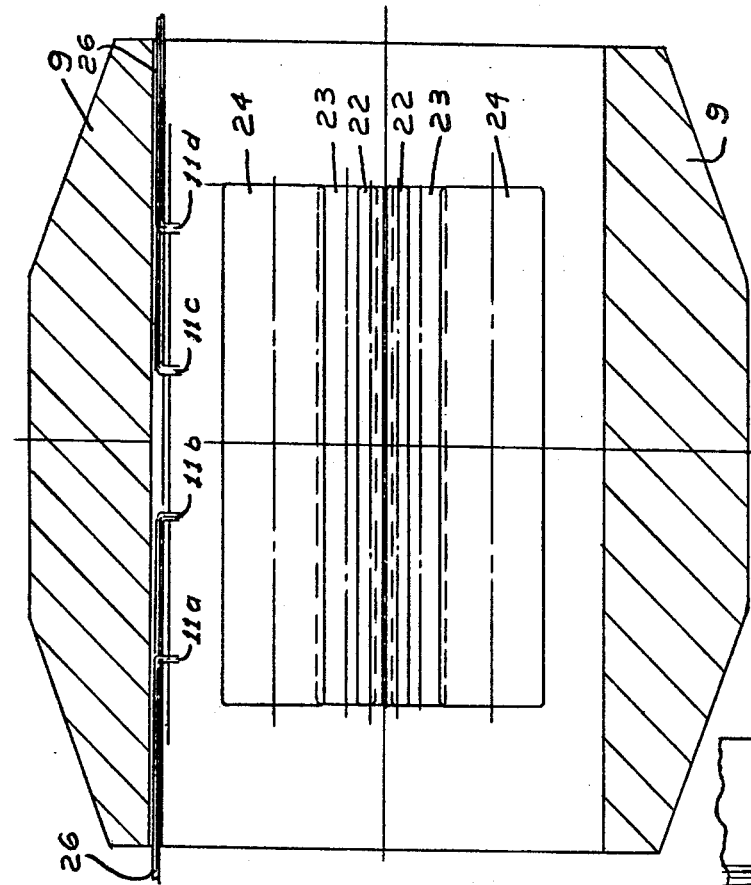
FIG. 7 is a sectional view along line 7—7 of FIG. 6.

FIGS. 1 and 2 illustrate an example of a tapered neck 1 of a roll R, of a rolling mill with a sleeve 2, having a cylindrical outside diameter shrunk onto said neck 1, over a heat-insulating layer 3. The bearing substance 4 in accordance with the invention, is confined within the cavity of the mill chock 5, whose walls are lined with an insulating layer 6, which supports the heat-absorbing layer 7. The latter is a plate curved to the shape of the chamber or cavity and is composed of completely enclosed channels or conduits 8, through which a cooling medium, preferably a liquid, is passed. Chock 5, which is located within the columns 9, of the mill housing has freedom of movement in a vertical direction only, according to the setting of the screw 10, which transfers the rolling load from said chock 5 to its housing 9.

The bearing substance in a liquid state is injected through nozzles 11, against the pressure prevailing within the bearing cavity. It is injected in carefully measured quantities by means known in the art in accordance with signal computed from indication of gauges 12, which may be either of the contacting or noncontacting type, i.e., proximity type gauges. These gauges detect the displacement of the cylindrical surface of the sleeve 2, which occurs as a result of the wear of the bearing substance 4 at the interface with sleeve 2. They cause the restoration of the sleeve bushing 2 to its original position by transmitting the necessary signal impulses to the control system distributing the bearing fluid.

The nozzles 11 are provided at suitable locations in the cavity of the chock 5, so that the position of the shaft 1 can be restored irrespective of the direction in which it has moved. FIG. 1 shows a relatively short bearing, so that there is only one set of nozzles along the axis of the bearing, but there are two nozzles in that set, one on each side of the plane of symmetry of the chock. The reasons for this is that the shaft or neck 1 may be displaced, due to wear of the bearing material, not only vertically, in the principal direction of the acting force, but also laterally. Consequently, if the neck 1 is found to have moved say 0.00012 inch upwards and 0.00030 inch to the left, then a bigger quantity of liquid-bearing material will be squirted into the right-hand nozzle 11 than into the left-hand one, and in accurately computed proportions.

The depth of the bearing material 4, i.e., the distance between the surface of the neck 1 and the cavity formed by the cooling shell 7 within the chock 5 is important, and in bearings designed for carrying high loads which consequently require a relatively rapid replacement of the bearing material 4, this depth should be high relative to the diameter of the shaft 1, in order to give the bearing material 4 a better chance to "creep," i.e., to flow under pressure and thus to better equalize the specific pressure exerted by the neck 1 against its contact area with the bearing material.

In the case of ice serving as the bearing material and operating at not too low temperatures, that flow may not be a pure "

creep" in the sense as it is known in metals, but the mass of the bearing material may be crushed or shattered into small pieces which, however, present a compact mass, under the pervasive pressure prevailing within the bearing cavity, so that, for the operation of the bearing, it is of no consequence whether the creeping of the bearing material takes place in the form of a continuous mass, or in shattered pieces. The mass of shattered or granulated pieces welds again into a solid mass very quickly.

Electric heating wires maintain the bearing fluid in liquid state so it forms a pool 13 after injection into the bearing cavity and solidifies soon afterwards.

FIG. 4 shows flexible seal 14 scraping the molten or used quantity of the bearing substance together with whatever solid ingredients it may contain into its trough 14' from which it may be permitted to escape, or be drawn by vacuum through opening 15.

The edge 4' of bearing substance 4, which is slowly creeping under pressure towards seal 14, is melted by heating element 16, which is energized by pressure imposed thereon. The control system shows heater 16 mounted on levers 17, which operate switch 18 when heater 16 is pressed down by bearing substance 4, and which is deactivated after heater 16 has melted enough substance 4 to free itself of the pressure.

Figure 3:
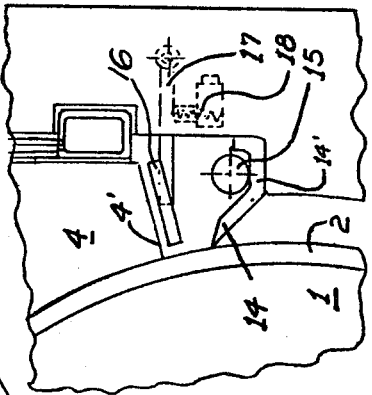
FIG. 3 is an enlarged cross section of a detail shown in FIG. 1.

The apparatus shown in FIG. 3 is used in reverse before each stopping of shaft 1 to prevent restarting difficulties due to a solidification ro freezing of the surface of the shaft with the bearing material 4. A suitable adhesion-preventing grease compound may be fed through opening 15 and spread by wiper 14 over the surface of sleeve 2 before the shaft 1 is stopped.

Wear of the bearing substance 4 at the contact area with the surface of the shaft or roll neck 2 is caused chiefly by melting, and a thin liquid layer arising by the heat generated at the interface, causes the friction to below. This friction may be lowered still further, under some load and speed conditions, by additional application of extraneous lubricant, such as oil mist lubrication and also by plating or impregnating the neck of the shaft with friction reducing media such as Teflon, chromium, molybdenum-disulfate and the like. Under some circumstances, such media, in particle form, may also be dispersed within the bearing substance itself.

FIGS. 4 and 5 show the invention as applied to a vertical spindle S, such as used in milling machines and other tools, which is subjected to both radial and thrust loads. The bearing is divided into four upper and four lower lobes, each one of which takes its share of the radial and one-way thrust load. The bearing substance 4 is contained, refrigerated, insulated and replenished in the same manner as in the case of the radial bearings shown in FIGS. 1 and 2, except that its cavity is open in one axial direction to present a bearing segment to take thrust load exerted by one collar 21 or 21', at the bottom and top of the spindle, respectively.

Position gauges 12 and 12', indicate and control, by actuating the bearing replenishing system, the position of the shaft S, along the two principal axes as well as in the vertical direction.

As can be seen from the drawings, the application of the present invention permits the operation of the bearing in such a manner as to make it completely free of play, even under conditions of all-sided pressure. This is particularly valuable for some applications, e.g., machine tool spindles, where even a very small clearance as is required in oil-film bearings can cause vibrations, produce chatter marks, and impair the accuracy of the cutting head.

Bearings operated according to this invention will maintain a stable temperature even in spite of abuse or accident. A temporary overload will only cause faster melting of the bearing material. Even a rough spot on the shaft or presence of a foreign body, such as a metallic chip, will only cause a higher consumption of the bearing substance, whereas, on conventional oil-lubricated bearings any breakdown of the oil film or similar occurrences entail a chain reaction leading to a quick self-destruction of the bearing. Materials enumerated above permit selection of a bearing material corresponding to a temperature most appropriate for a given machine For instance, ice can operate at temperatures up to 0° C., waxes around 50° C. and fusible metals around 100° C. This feature makes it possible to use such bearings for purposes where conventional bearings cannot be used.

Bearings with multiple lobes may be used in arrangements other than that illustrated in FIGS. 4 and 5 embodying a vertical spindle. Such may be used in bearings for horizontally disposed rolls as well. In all cases, bearings according to this invention may safely be operated with one lobe exerting pressure against the opposite one, the added load only resulting in a higher rate of melting of the bearing substance 4, but still preserving the same uniform temperature, free of all overheating and heat distortion.

Figure 6:
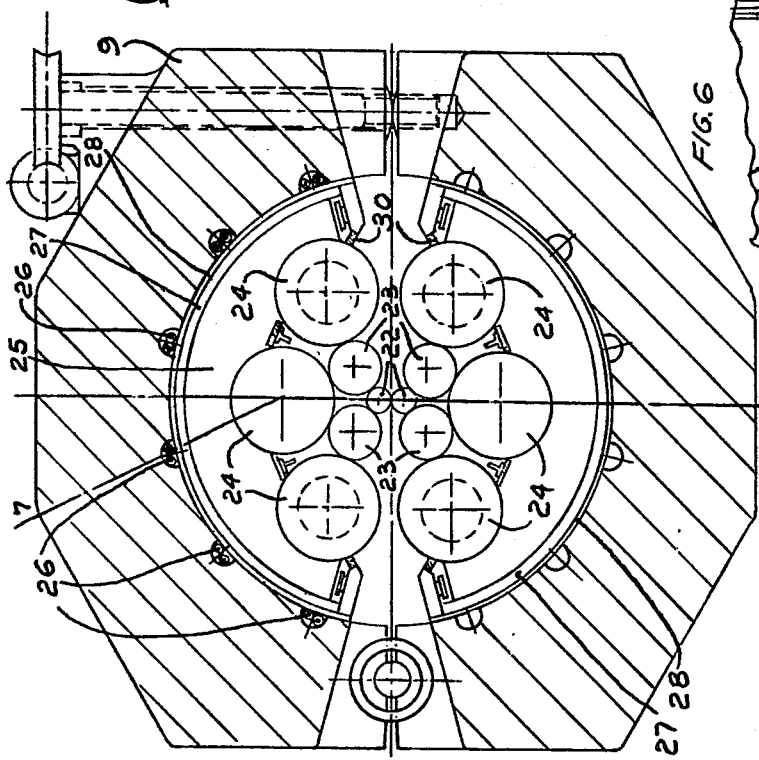
FIG. 6 is a vertical sectional view of a cluster rolling mill embodying the instant invention.

FIGS. 6 and 7 show a cluster mill for cold rolling metal strips of great width and using small diameter cluster-backed work rolls. Each work roll 22, is backed by a pair of intermediate rolls 23, which in turn are backed by driven outer intermediate rolls 24. These outer rolls are smoothly ground initially, but with use they develop rough spots, mostly due to foreign matter, such as metal chips which enter the mill. In conventional mills these outer rolls 24, are, in turn, backed be bearing casters of still larger diameter and located in saddles in the rigid housing of the mill, as shown in U.S. Pat. Nos. 3,076,360 and 2,776,586. According to this invention, these outer casters become unnecessary and rolls 24, and in some cases even the first intermediate rolls 23, may be backed directly by such creep-flow bearings extending along the whole roll face. In this case the ice bearing 25 may be continuous, encompassing all three backing rolls 24, being only sealed by seals 30 at the edges of the loaded bearing area.

A replenishing supply of water or whatever other bearing substance is selected, is fed through pipes 26 at the right and left of the plane of symmetry of the load for each roll 24. Pipes for circulating cooling fluid 27 are disposed close to the surface of the bore of the housing 9, and are separated from it by a heat insulating layer 28.

The most important problem that these bearings automatically solve, is the possibility of varying the quantity of replenishing bearing substance along the face of the rolls, through nozzles 11a, 11b, 11c and 11d, thereby accomplishing two objectives:

(1) To maintain the exact geometric position of the rolls in relation to the housing 9, in particular their parallelism, along the entire face of the rolls 24, in spite of the fact that these rolls may not be equally smooth on all of their surfaces and, in fact, may have some rough spots.

(2) To exert a controlled amount of pressure upon the inner intermediate rolls 23, backed by them, depending upon the requirements of the rolling process, which even, when required, may be variable along the face of the rolls. For instance, if the rolled sheet should show waves near an edge, roll pressure at that spot should be diminished by a very accurate degree, in order to produce a flat sheet.

This is easily accomplished by diminishing the supply of liquid bearing substance, according to the operator's observation, or better still, according to signals by gauges indicating the exact position of the surface of the respective rolls or indicating the condition of the rolled strip itself, such as a cross-tensiometer which detects wavy spots in a strip rolled under tension. In such case these controls can be automatic to produce constantly a flat sheet irrespective of the variation in the profile of the raw material, wear of the rolls and other factors.

It must be stressed that these bearings eliminate one of the most annoying and complex problems in cold rolling metal sheets, and that is, temperature variations and consequent heat expansion of the rolls, bearings, housing and other elements of the mill. The bearing substance such as ice, must be and is easily maintained at a stable temperature at which its mechanical strength and characteristics are most suitable. Its melting point is also stable and definite so that any heat which may be generated locally by the rolling friction between the work rolls and the workpiece or between the rolls and their backing rolls is quickly absorbed by the heat which is required to melt the bearing substance.

Many refinements may be made to the units described above, which fall within the purview of the present invention. Thus, the supply conduits for the phase-changing medium in the liquid state which open into the chamber may be jacketed with electrical heating means as well as insulating means to maintain the medium in a fluid state for addition to the mass of the medium within said chamber, until it is solidified by the action of the cooling coils 8. Also, the cluster rolling mill shown in FIGS. 6 and 7 may assume different forms other than hinged rigid clam-shell type housings which are connected by screw-down means, as shown in the drawings.

I claim:

1. An apparatus for maintaining substantially constant the relative positioning between the path of a movable element and a support therefor provided with a phase-changing lubricating and pressure-bearing medium therebetween, comprising
   a. a chamber in said support for containing a mass of said medium capable of assuming a solid state within said chamber and up to the surface of said movable element; to fix the relative positioning between said surface and support,
   b. means for replenishing said medium in a fluid state and under pressure in controlled amounts at the portions of said chamber where said relative positioning has been modified in response to physical effects, said means being responsive to the changes of position of the movable element as a result of wear, pressure or other factors,
   c. heat-exchange at the boundaries of said chamber spaced from said movable surface for transforming said newly supplied medium in a fluid state to the solid state, and
   d. thermal insulating means at least on the boundaries of said chamber beyond said heat-exchange means to direct the effects of the latter towards said phase-changing medium to control more effectively the physical state thereof.

2. An apparatus as set forth in claim 1, wherein said phase-changing lubricating medium comprises ice which is transformed from water in a fluid state by the operation of said heat-exchange means in the form of refrigerating coils.

3. An apparatus as set forth in claim 1, wherein said phase-changing lubricating medium has the characteristics of a solid of a low coefficient of friction at the temperature and load conditions of a bearing, and creep characteristics evidenced by a slow sliding of particles in the direction of lesser stresses.

4. An apparatus as set forth in claim 3, wherein said lubricating medium is solidified water or ice.

5. An apparatus as set forth in claim 3, wherein said phase-changing medium is wax, paraffin or other organic compound having a sharp transition from the molten to the solid state.

6. An apparatus as set forth in claim 3, wherein said phase-changing medium is a metal or alloy having a low melting point selected from the group consisting of lead, bismuth, tin, zinc, aluminum and alkali metals.

7. An apparatus as set forth in claim 3, wherein said phase-changing lubricating medium includes solids having friction-reducing characteristics.

8. An apparatus as set forth in claim 3, wherein said phase-changing lubricating medium is of a material having a sharp transition characteristic from its liquid to its solid state, selected from the group consisting of ice, wax, paraffin and low-temperature melting metals and alloys thereof, with the addition of solid particles having friction-reducing characteristics selected from the group consisting of Teflon, chromium and molybdenum-disulfate.

9. An apparatus for maintaining substantially constant the relative positioning between a rotary roll and a bearing support therefor provided with a phase-changing lubricating medium therebetween, comprising
   a. at least one chamber, disposed along the face of said roll, in said bearing support for containing a mass of said medium capable of assuming a solid state within said chamber and up to the surface of said rotary roll, to fix the relative positioning between said roll and bearing support,
   b. means for replenishing, in controlled amounts, said medium in a fluid state and under pressure at the portions of said chamber where said medium has been partially depleted in consequence of the physical effects acting on said roll,
   c. said last-mentioned means comprising a position-sensing device responsive to changes in relative positions between the rotary roll and bearing support as a result of wear, pressure or other factors,
   d. refrigerating means at the boundaries of said chamber spaced from said rotary roll surface for transforming said newly supplied medium in the fluid state to the solid state which is characteristic of said medium adjacent to said rotary roll, and
   e. heat-insulating means at least on the boundaries of said chamber beyond said refrigerating means to direct the effects of the latter towards said phase-changing medium to control more effectively the refrigerating effects thereof.

10. An apparatus as set forth in claim 9, wherein said phase-changing lubricating medium has the characteristics of a solid of a low coefficient of friction at the temperature and load conditions maintained in said chamber of the bearing, and creep characteristics evidenced by a slow sliding of particles in the direction of lesser stresses.

11. An apparatus as set forth in claim 9, wherein said rotary roll is provided with a sleeve sheathing at said bearing support including a layer of heat-insulating material between said sheathing and roll.

12. An apparatus as set forth in claim 9, wherein said replenishing means comprises at least one conduit for the lubricating medium opening into said chamber at a point remote from said rotary roll, and heating means for said conduit for maintaining said medium in a fluid state at least until it enters said chamber beyond said refrigerating means.

13. An apparatus as set forth in claim 12, including a heat-insulating jacket between said last-mentioned heating means and said refrigerating means.

14. An apparatus as set forth in claim 9, including a heating device for the lubricating medium at the boundaries of the loading areas adapted to melt the excess bearing medium which is extruded beyond the loaded zone.

15. An apparatus as set forth in claim 14, including control means for said heating device responsive to pressure of said excess bearing medium.

16. An apparatus as set forth in claim 1, wherein said first-mentioned replenishing means comprises sensing means mounted on said support to indicate variations in the relative positioning of said movable element on said support.

17. An apparatus as set forth in claim 16, including at least one conduit for the medium, opening into said chamber at a point remote from said movable element for controllably supplying said medium to said chamber in response to said sensing means to restore automatically the position of said movable element on said support.

18. An apparatus as set forth in claim 9, wherein said first-mentioned replenishing means comprises sensing means mounted on each side of the central pressure plane to indicate variations in the relative position of said roll on said bearing support along both the vertical and horizontal axes.

19. An apparatus as set forth in claim 18, including at least one conduit for the lubricating medium in a fluid state on each side of said central pressure plane and opening into said chamber at a point remote from said rotary roll for supplying said medium to said chamber in response to said sensing means to restore the position of said roll along both the vertical and horizontal axes.

20. An apparatus as set forth in claim 1, wherein said movable element is a rotary spindle and said support is provided with a plurality of diametrically opposed chambers around said spindle, each filled with said mass of lubricating and pressure-bearing medium to exert a pressure against one another, thereby to eliminate all play.

21. An apparatus as set forth in claim 20, wherein said chambers are open at the opposite ends thereof transversely of the axis of said spindle, and thrust collars at said ends cooperating with the phase-changing medium in said chambers at said ends.

22. An apparatus as set forth in claim 20, wherein the rotary spindle is mounted on a vertical axis and the diametrally opposed chambers therearound are four in number.

23. An apparatus as set forth in claim 21, wherein said rotary spindle is mounted on a vertical axis and the diametrally opposed chambers therearound comprise two sets at different levels adjacent to the opposite ends of the support, with four chambers in each set.

24. An apparatus for maintaining substantially constant the relative positioning between rotary rolls of a rolling mill and the bearing supports therefor in housings for said rolls provided with chambers containing a phase-changing lubricating medium comprising
   a. a pair of interconnected hinged rigid clamshell-type housings,
   b. a work roll in each housing and a plurality of backing rolls therefor;
   c. each housing containing a mass of said medium capable of assuming a solid state within said chambers adjacent to said backing rolls to fix the relative positioning between all said rolls and bearing supports,
   d. means for replenishing, in controlled amounts, said medium in a fluid state and under pressure at longitudinally displaced portions of said chambers where said medium has been partially depleted in consequence of the physical effects acting on said rolls, comprising sensing means responsive to changes in relative positions between said last-mentioned rolls and the bearing supports therefor as a result of wear, pressure or other factors,
   e. refrigerating means at the boundaries of each chamber spaced from said rotary roll surfaces for transforming said newly supplied medium in the fluid state to the solid state which is characteristic of said medium adjacent to said backing rolls, and
   f. heat-insulating means at least on the boundaries of each chamber beyond said refrigerating means to direct the effects of the latter towards said phase-changing medium to control more effectively the refrigerating effects thereof.

25. An apparatus as set forth in claim 24, wherein said replenishing means comprises a plurality of conduits for said lubricating medium in a liquid state opening into said chambers at points remote from said rolls for controllably supplying said medium to said chambers at displaced points along the lengths of said rolls.

26. An apparatus as set forth in claim 25, including heat-exchange means for maintaining said bearing supports and backing rolls substantially uniform temperature close to the melting point of the lubricating medium.

27. An apparatus as set forth in claim 25, wherein said sensing means is responsive to the output of the rolling mill for controlling the supply of the lubricating medium which is fed to the individual conduits.

28. An apparatus as set forth in claim 27, for rolling metal strips of great width wherein said sensing means comprises a cross-tensiometer for indicating fluctuations in the tension of the strip across the width thereof to automatically eliminate or at least reduce said fluctuations.

29. The method of maintaining substantially constant the relative positioning between the path of a movable element and a bearing support therefor provided with a phase-changing lubricating and pressure-bearing medium therebetween of substantial volume capable of resisting large pressure forces transmitted through said movable element, said medium having a solid state adjacent to the interface between said movable element a and support and a creeping fluent state remotely therefrom, as determined by temperature and pressure conditions, which comprises the steps of sensing any changes in relative positioning between the path of said movable element and the bearing support therefor from the desired substantially constant setting therebetween, and adding predetermined quantities of the bearing medium in a liquid state to the mass thereof remote from said interface corresponding to said sensing indications, and controlling the temperature thereof to effect its congealing to a solid state to maintain substantially constant said relative positioning.

30. The method of maintaining substantially constant the relative positioning between a rotary roll and a bearing support therefore, provided with a phase-changing lubricating and pressure-bearing medium therebetween of substantial volume capable of resisting large pressure forces transmitted through said rotary roll, said medium having a solid state adjacent to the cylindrical interface between said roll and bearing support and a creeping fluent state remotely therefrom, as determined by temperature and pressure conditions, which comprises the steps of sensing any changes in relative positioning between the path of said rotary roll and the bearing support therefor from the desired substantially constant setting therebetween, adding predetermined quantities of the bearing medium in a liquid state to the mass thereof remote from said interface corresponding to said sensing indications, and controlling the temperature thereof to effect its congealing to a solid state to maintain substantially constant the relative positioning between said roll and bearing support.

UNITED STATES PATENT OFFICE
CERTIFICATE OF CORRECTION

Patent No. 3,602,556           Dated August 31, 1971

Inventor(s) TADEUSZ SENDZIMIR

It is certified that error appears in the above-identified patent and that said Letters Patent are hereby corrected as shown below:

In claim 1, column 5, line 34, before "at" insert --means--.

In claim 26, column 8, line 5, after "rolls" insert --at a--.

In claim 30, column 8, line 36, change "therefore" to --therefor--.

Signed and sealed this 16th day of May 1972.

(SEAL)
Attest:

EDWARD M. FLETCHER, JR.          ROBERT GOTTSCHALK
Attesting Officer                Commissioner of Patents